United States Patent
Hsu et al.

(10) Patent No.: US 9,092,598 B2
(45) Date of Patent: Jul. 28, 2015

(54) VERSION-BASED SOFTWARE PRODUCT ACTIVATION

(75) Inventors: Wen-Pin Scott Hsu, Redmond, WA (US); Tarik Soulami, Redmond, WA (US); Richard S. Eizenhoefer, Redmond, WA (US); Ning Zhang, Bothell, WA (US); Anil Bazaz, Redmond, WA (US); Thomas J. Layson, Monroe, WA (US); Josue L Noriega de la Vega, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1150 days.

(21) Appl. No.: 12/512,602

(22) Filed: Jul. 30, 2009

(65) Prior Publication Data
US 2011/0030062 A1    Feb. 3, 2011

(51) Int. Cl.
G06Q 99/00    (2006.01)
G06F 21/12    (2013.01)
G06Q 20/00    (2012.01)
G06Q 20/12    (2012.01)

(52) U.S. Cl.
CPC ............ *G06F 21/121* (2013.01); *G06Q 20/00* (2013.01); *G06Q 20/1235* (2013.01); *G06Q 2220/18* (2013.01)

(58) Field of Classification Search
CPC   G06Q 20/00; G06Q 20/1235; G06Q 2220/18
USPC ......................................... 705/50, 51, 58, 59
See application file for complete search history.

(56) References Cited

U.S. PATENT DOCUMENTS

| 5,790,664 | A | 8/1998 | Coley et al. |
| 7,552,341 | B2* | 6/2009 | Chen et al. .................... 713/187 |
| 2004/0143746 | A1 | 7/2004 | Ligeti et al. |
| 2005/0289072 | A1 | 12/2005 | Sabharwal |
| 2006/0059571 | A1* | 3/2006 | Chen et al. ....................... 726/29 |
| 2006/0116966 | A1* | 6/2006 | Pedersen et al. ................ 705/59 |
| 2008/0301447 | A1 | 12/2008 | Hughes et al. |

(Continued)

OTHER PUBLICATIONS

Tuunanen, et al., "ASLA: Reverse Engineering Approach for Software License Information Retrieval", Retrieved at <<http://ieeexplore.ieee.org/stamp/stamp.jsp?arnumber=01602380>>, Proceedings of the Conference on Software Maintenance and Reengineering (CSMR'06), Mar. 22-24, 2006, pp. 4.

(Continued)

*Primary Examiner* — James D Nigh
(74) *Attorney, Agent, or Firm* — Timothy Churna; Kate Drakos; Micky Minhas (57) ABSTRACT

A software license for a particular version of a software product on a computing device includes both a branding identifier that identifies the particular version of the software product and component dependency information that identifies one or more aspects of the particular version of the software product. To activate a software product on the computing device, the branding identifier is compared to a portion of the software product on the computing device. If the branding identifier matches the portion of the software product, then the component dependency information is compared to one or more aspects of the software product on the computing device. If the component dependency information matches the one or more aspects of the software product then the software product is activated. Otherwise, the a license state of the software product is kept unchanged.

31 Claims, 5 Drawing Sheets

(56) References Cited

U.S. PATENT DOCUMENTS

2008/0319779 A1* 12/2008 Hughes et al. .................... 705/1
2009/0119779 A1   5/2009 Dean et al.
2010/0281102 A1* 11/2010 Chinta et al. ................. 709/203

OTHER PUBLICATIONS

"Logic Protect", Retrieved at <<http://www.supershareware.com/info/logic-protect.html>>, Nov. 27, 2006, pp. 3.

* cited by examiner

VERSION-BASED SOFTWARE PRODUCT ACTIVATION

BACKGROUND

Software manufacturers oftentimes desire to protect the software products they develop so that only authorized users are permitted to access the software products. One technique developed for enforcing such protection is to have the computer on which a software product is installed access a remote server in order to activate the software product. While such protection can be useful, it is not without its problems. One such problem is that due to their design and/or physical locations some computers do not have access to the remote server, making it difficult for such computers to access the remote server to activate the software product.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a branding identifier that identifies a particular version of a software product is obtained from a software license of the computing device. The branding identifier is compared to a portion of the software product on the computing device, and if the branding identifier does not match the portion of the software product then the license state of the software product is kept unchanged. However, if the branding identifier matches the portion of the software product, then component dependency information identifying one or more aspects of the particular version of the software product is obtained from the software license. The component dependency information is compared to one or more aspects of the software product on the computing device. If the component dependency information matches the one or more aspects of the software product then the software product is activated, otherwise the license state of the software product is kept unchanged.

In accordance with one or more aspects, both a branding identifier and component dependency information are obtained for a particular version of a software product. The branding identifier identifies a particular version of a software product, and the component dependency information identifies one or more aspects of the particular version of the software product. A software license is generated including both the branding identifier and the component dependency information.

BRIEF DESCRIPTION OF THE DRAWINGS

The same numbers are used throughout the drawings to reference like features.

DETAILED DESCRIPTION

Version-based software product activation is discussed herein. A software product can be activated on a computing device without any communication with a remote activation service. A software license on the computing device includes both a branding identifier and component dependency information. The branding identifier identifies a particular version of a software product, and the component dependency information identifies one or more aspects of that particular version of the software product.

To activate the software product on the computing device, the branding identifier is compared to a portion of the software product (e.g., part of a file of the software product) on the computing device and a determination is made as to whether the branding identifier matches the portion of the software product. Subsequently, the component dependency information is compared to one or more aspects of the software product on the computing device and a determination is made as to whether the component dependency information matches the one or more aspects of the software product. If both the branding identifier matches the portion of the software product and the component dependent information matches the one or more aspects of the software product, then the version of the software product on the computing device is deemed to be the particular version of the software product to which the software license corresponds and the software product on the computing device is activated. Otherwise, the software product license state on the computing device remains unchanged.

Figure 1:
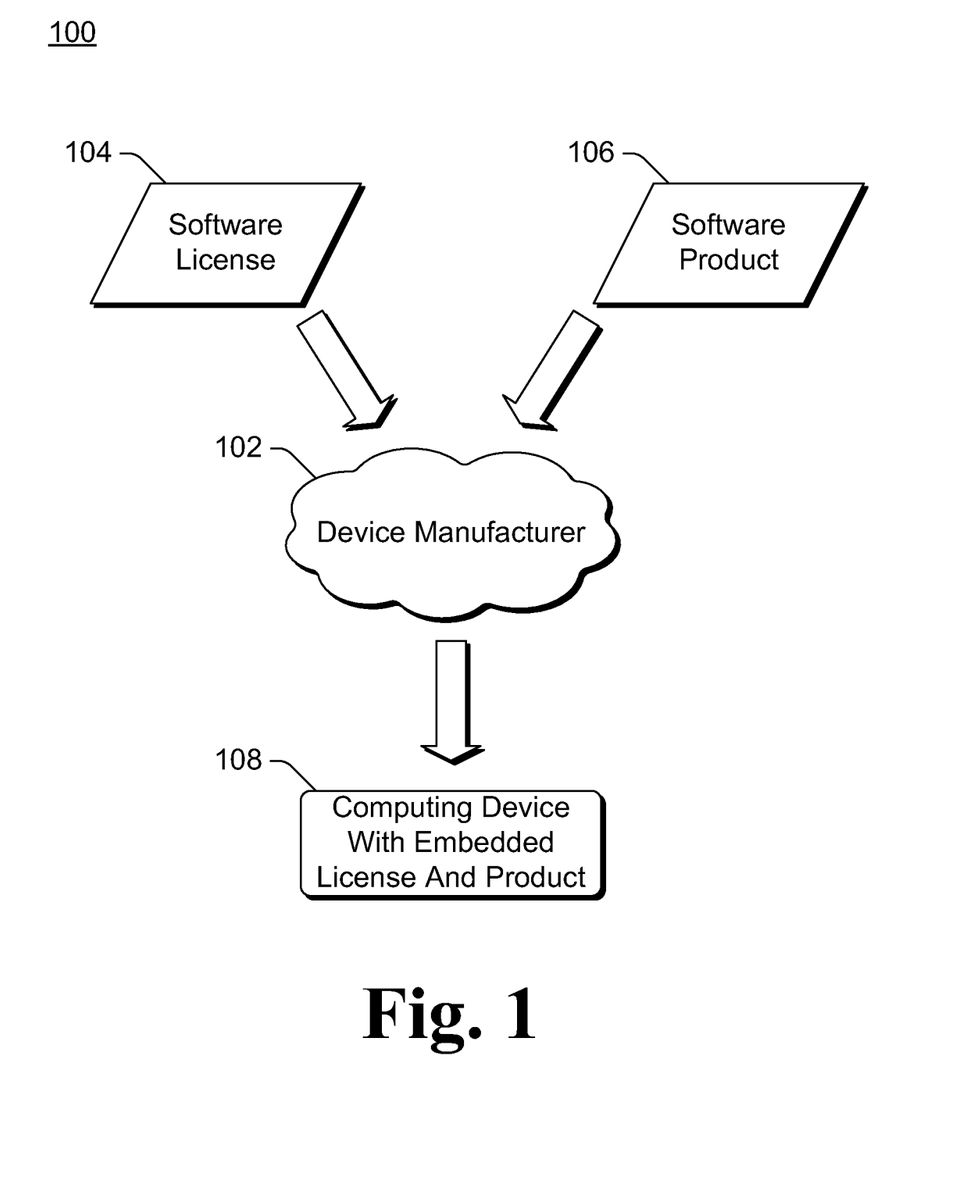
FIG. 1 illustrates an example system implementing the version-based software product activation in accordance with one or more embodiments.

FIG. 1 illustrates an example system 100 implementing the version-based software product activation in accordance with one or more embodiments. System 100 includes a device manufacturer 102 that obtains a software license 104 and a software product 106. Device manufacturer 102 can generate license 104 and/or product 106, or alternatively obtain one or both of license 104 and product 106 from another source. Software product 106 can be a variety of different types of software products, such as an operating system, a game or other recreational product, a business product (e.g., word processing product, spreadsheet product, database product, etc.), audio and/or video processing or playback product, and so forth.

Software product 106 is a particular version of a software product. Software manufacturers oftentimes have multiple different versions of the same software product, with different versions offering different functionality and/or benefits. For example, a particular operating system product may have multiple different versions ranging from a base version that is least expensive and offers basic functionality to an enhanced version that is most expensive and offers more functionality than the base version. One or more additional versions can also exist between these base and enhanced versions. Software license 104 is a license associated with a particular version of software product 106 that allows a computing device to activate and use that particular version of software product 106.

Device manufacturer 102 represents one or more computing or other devices, as well as optionally individuals or other services, that manufacture a computing device 108. This manufacturing can include assembling and/or building one or more components as well as adding software products to computing devices, resulting in computing device 108. Software license 104 as well as software product 106 are embedded in computing device 108. Accordingly, computing device 108 can be subsequently used by a user, and software product 106 activated by computing device 108 without any communication with another server or service, as discussed in more detail below.

Computing device 108 can be a variety of different devices capable of running software product 106. For example, computing device 108 can be a desktop computer, a mobile station, an entertainment appliance, a set-top box communicatively coupled to a display device, a cellular or other wireless phone, a game console, an automotive computer, and so forth. Thus, computing device 108 may range from a full resource device with substantial memory and processor resources (e.g., personal computers, game consoles) to a low-resource device with limited memory and/or processing resources (e.g., traditional set-top boxes, hand-held game consoles).

Figure 2:
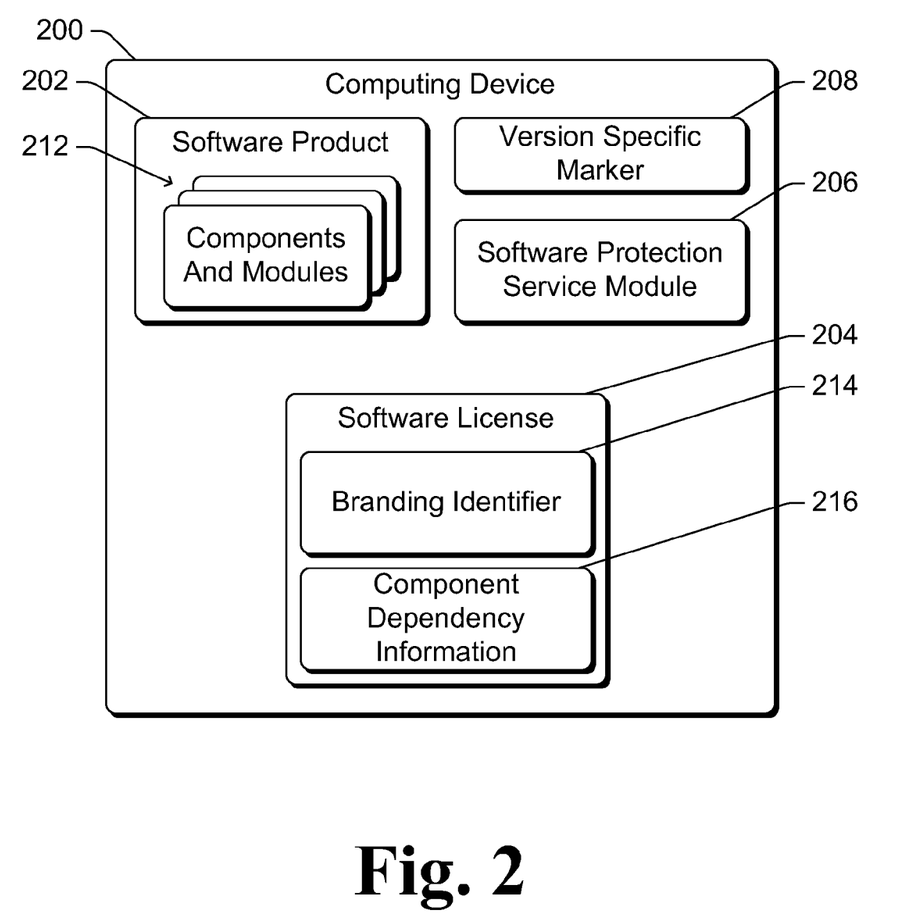
FIG. 2 is a block diagram illustrating an example computing device implementing the version-based software product activation in accordance with one or more embodiments.

FIG. 2 is a block diagram illustrating an example computing device 200 implementing the version-based software product activation in accordance with one or more embodiments. Computing device 200 can be, for example, computing device 108 of FIG. 1. Analogous to computing device 108, computing device 200 can be a variety of different devices.

Computing device 200 includes a software product 202, a software license 204, a software protection service module 206, and a version specific marker 208. Computing device 200 can also optionally include other components and/or modules to provide additional functionality, although such components and/or modules are not shown in FIG. 2 so as to avoid cluttering the drawings.

Software product 202 is a particular version of a software product. Although discussed herein as software, it is to be appreciated that product 202 can be implemented as, or include, firmware. Software product 202 includes one or more components or modules 212 that include various instructions that are executed by one or more processors of computing device 200 and/or various data that is used during execution of the instructions. Software product 202 is typically installed or otherwise included on computing device 200 by the manufacturer or distributor of device 200, and thus software product 202 is also referred to as an embedded software product. Software product 202 can be a variety of different types of software products, analogous to the discussion above regarding software product 106 of FIG. 1.

In order to license software product 202, product 202 is activated by software protection service module 206. This activation refers to a verification that a software license is present on computing device 200 that corresponds to the particular version of software product 202 that is present on computing device 200. This activation is performed by module 206 without needing to access any external or remote activation service, device, individual, and so forth. Module 206, or alternatively another component or module of computing device 200, prevents software product 202 from being licensed unless software product 202 is activated by module 206. Once licensed, product 202 can be run on computing device 200. Product 202 can optionally be allowed to run for a limited amount of time and/or with limited functionality until activated. Software protection service module 206 determines whether to activate software product 202 based on software license 204, software product 202, and optionally version specific marker 208.

Software license 204 is a software license corresponding to software product 202. Software license 204 is, for example, a software license 104 of FIG. 1. Software license 204 is typically included on computing device 200 by the manufacturer or distributor of device 200, and thus software license 204 is also referred to as an embedded software license.

Software license 204 includes a branding identifier 214 and component dependency information 216. Branding identifier 214 and component dependency information 216 are used by software protection service module 206 to associate software license 204 with software product 202, and to allow software product 202 to be activated on computing device 200. Software protection service module 206 can be implemented in software, firmware, hardware, or combinations thereof.

As discussed in more detail below, software protection service module 206 can determine whether software license 204 is a software license for the version of the software product that is included on computing device 200 as software product 202. Module 206 can make such a determination without accessing a remote activation service or individual. If software license 204 is a software license for the version of the software product that is included on computing device 200 as software product 202, then module 206 activates software product 202 (or otherwise indicates that software product 202 can be activated). This activation of software product 202 also results in a license state of software product 202 being changed (e.g., to indicate that software product 202 is activated). The license state of software product 202 can be maintained in different locations in computing device 200, such as in license state store maintained by software protection service module 206, as part of software license 204, as part of software product 202, and so forth.

However, if software license 204 is not a software license for the version of the software product that is included on computing device 200 as software product 202, then module 206 keeps the license state of software product 202 unchanged. Keeping the license state of software product 202 unchanged refers to not altering the license state, such as by not activating software product 202 (or otherwise indicating that software product 202 is not to be activated). Depending on the terms or conditions of software license 204, product 202 can optionally still be allowed to run for a limited amount of time and/or with limited functionality even though product 202 is not activated.

Branding identifier 214 identifies a particular version of software product 202. Different versions of a software product typically include at least some components or modules that differ from one another. These differences can be, for example, different instructions, different instruction orders, different data, and so forth. Branding identifier 214 identifies at least part of one or more components or modules that is present in one or more components or modules of a particular version of software product 202 but is not present in components or modules of other versions of software product 202. This allows the particular version of software product 202 to be distinguished from other versions of software product 202 based on branding identifier 214.

In one or more embodiments, branding identifier 214 is a string of characters obtained from a dynamic link library (DLL) or other binary file of a component or module of software product 202. Software protection service module 206 is aware of the particular portion of the software product to which the string corresponds, such as by being pre-configured with an indication of the particular portion, by obtaining an indication of the particular location from software license 204, by obtaining an indication of the particular location from another component or module, and so forth. Software protection service module 206 obtains a string of characters from the particular portion of software product 202. Alternatively, the string obtained from software product 202 can be generated by concatenating (or combining in other manners) characters from multiple different portions of software product 202. Module 206 compares the string in branding identifier 214 to the string of characters obtained from the software product 202 and determines if the two strings match. The two strings match if the two strings of characters are the same (or at least particular portions of the two strings are the same or a threshold number of characters in the two strings are the same) and/or other criteria specified in the license are met.

If the two strings match, then software protection service module 206 determines that a first part of the process for activating software product 202 is successful. If the two strings do not match, then software protection service module 206 determines that software license 204 does not correspond to the version of the software product that is software product 202, and thus software product 202 is left un-activated (the license state of software product 202 is kept unchanged).

This first part of the process for activating software product 202 can be performed by module 206 regardless of whether software product 202 is installed on computing device 200. For example, one or more files used to install software product 202 on computing device 200 can be used as the portion of software product 202 that is compared to branding identifier 214. Alternatively, this first part of the process for activating software product 202 can be performed by module 206 after software product 202 is installed on computing device 200. For example, one or more files of software product 202 as installed on computing device 200 can be used as the portion of software product 202 that is compared to branding identifier 214.

A second part of the process for activating software product 202 involves component dependency information 216. This second part is typically performed after software product 202 is installed on computing device 200. Alternatively, this second part can be performed before software product 202 is installed on computing device 200 (e.g., by analyzing installation information indicating what changes are made to computing device 200 when software product 202 is installed on computing device 200).

Component dependency information 216 identifies one or more aspects of a particular version of software product 202. The aspects of a particular version can take a variety of different forms, such as the presence of particular files, the size or content of particular files, particular settings in an operating system registration store (e.g., an operating system registry), the presence of a particular component or module as part of the software product, a maximum number of processors supported by the software product, a particular image or logo displayed to represent the software product to a user, and so forth.

Different versions of a software product typically include at least some aspects that differ from one another. Component dependency information 216 identifies one or more aspects of a particular version of software product 202 (the same version that branding identifier 214 identifies) that are not aspects of other versions of software product 202. This allows the particular version of software product 202 to be distinguished from other versions of software product 202 based on component dependency information 216.

Software protection service module 206 is aware of the particular aspects of software product 202 that are identified by component dependency information 216, such as by being pre-configured with an indication of the one or more aspects, by obtaining an indication of the one or more aspects from software license 204, by obtaining an indication of the one or more aspects from another component or module, and so forth. Software protection service module 206 obtains the one or more aspects of software product 202 and compares the one or more aspects in component dependency information 216 to the one or more aspects of software product 202 and determines if the aspects match.

An aspect identified in software license 204 can be compared to an aspect of software product 202 in a variety of different manners. The specific manner used for the comparison can vary based on implementation as well as the specific aspect. For example, the comparison can be checking for the presence of a particular component or module, checking for a particular setting or configuration value in a file or record, attempting to invoke particular functionality, checking for the presence or size of a particular file, and so forth.

Whether aspects match can be determined in different manners based on the specific aspects, such as determining that the aspects match if the one or more aspects in component dependency information 216 and the one or more aspects of software product 202 are the same, or by determining the aspect identified in component dependency information 216 is otherwise provided by or available from software product 202.

For example, if an aspect in the software license indicates that a setting of an operating system registration store is to have a particular value, then the value of that operating system registration store setting is compared to the value in the software license. If the two values are the same then the aspects match; otherwise the aspects do not match. By way of another example, if an aspect in the software license indicates that the version of the software product is to include a particular module or functionality, then a check is made as to whether the software product includes that particular module or functionality. If the software product includes that particular module or functionality, then the aspects match; otherwise the aspects do not match. By way of yet another example, if an aspect in the software license indicates that the version of the software product is to support a particular maximum number of processors, then a check is made as to whether a setting or configuration value of the software product that identifies the maximum number of processors supported by the software product is the same as the maximum number of processors indicated in the software license. If the two maximum number of processor values are the same then the aspects match; otherwise the aspects do not match.

If the aspects match, then software protection service module 206 determines that the second part of the process for activating software product 202 is successful. If the aspects do not match, then software protection service module 206 determines that software license 204 does not correspond to the version of the software product that is software product 202, and thus software product 202 is left un-activated (the license state of software product 202 is kept unchanged).

In one or more embodiments, the timing of when the second part of the process for activating software product 202 is performed can vary. For example, the timing of when the comparison of the one or more aspects in this second part of the process is performed can be a random timing (e.g., determined based on a pseudo-random number generator), a timing determined according to some other rule or algorithm, and so forth. By varying the timing of when the comparison of the one or more aspects in this second part of the process is performed, the difficulty encountered if a malicious user were to attempt to circumvent the version-based software product activation discussed herein increases because such a malicious user would not have knowledge of when the comparison is performed. In other embodiments, the timing of when the second part of the process for activating software product 202 is performed is a fixed amount of time after the first part of the process for activating software product 202 is performed.

Furthermore, the comparison of the one or more aspects in this second part of the process can be performed multiple times. These multiple times can be separated by regular or irregular time intervals, and the intervals between different comparisons can optionally vary. Additionally, each of these times that the comparison is made, the comparison can be made based on the same one or more aspects or alternatively different aspects or groupings of aspects. By performing the comparison multiple times, the difficulty encountered if a malicious user were to attempt to circumvent the version-based software product activation discussed herein increases because such a malicious user would not have knowledge of which aspects are compared at which times.

The result of performing this comparison of aspects multiple times can be used by software protection service module 206 in different manners. For example, module 206 can temporarily activate the software product after the first comparison is performed, but not fully activate the software product until after the multiple additional comparisons are performed (and the aspects match in each comparison). Such temporary activation can temporarily allow full functionality of the software product, such as allowing users to use all the features of the product until the next comparison is performed. By way of another example, module 206 can activate the software product after the first comparison is performed, and then subsequently perform multiple additional comparisons. If such a subsequently performed comparison indicates that the aspects do not match (e.g., the comparison fails), then an appropriate action can be taken by module 206 (e.g., deactivating the software product, reducing the functionality provided by the software product, and so forth).

In the discussions above, the first part of the process for activating software product 206 is based on branding identifier 214, and is followed by a second part of the process for activating software product 206 that is based on component dependency information 216. Alternatively, other orderings of these parts can be used. For example, the part of the process based on component dependency information 216 can be performed prior to the part of the process performed based on branding identifier 214. By way of another example, a first comparison of one or more aspects based on component dependency information 216 can be performed, followed by a comparison based on branding identifier 214, followed by a second comparison of one or more aspects based on component dependency information 216.

Software protection service module 206 can also activate software product 202 based at least in part on a version specific marker 208. Version specific marker 208 is set (e.g., on initial start-up of computing device 200) by module 206 (or alternatively another component or module) obtaining a marker value from software license 204 and storing the obtained marker value in a private location of device 200 (as marker 208). Version specific marker indicates whether the version-based software product activation discussed herein is to be used to activate software product 202, thus allowing software license 204 to specify whether module 206 is to determine whether to activate software product 202 using branding identifier 214 and component dependency information 216 as discussed above or whether some other technique is to be used to activate software product 202.

If version specific marker 208 is set to a proper value (e.g., a value that identifies the version of the software product to which software license 204 corresponds), then module 206 determines whether software license 204 corresponds to the version of software product 202 on computing device 200 using branding identifier 214 and component dependency information 216 as discussed above. However, if version specific marker 208 is not set to a proper value (e.g., is empty or contains a value that does not identify the version of the software product to which software license 204 corresponds), then module 206 does not determine whether software license 204 corresponds to the version of software product 202 on computing device 200 using branding identifier 214 and component dependency information 216. Rather, module 206 uses another technique to determine whether to activate software product 202, and/or another component or module determines whether to activate software product 202.

In one or more embodiments, the version specific marker 208 is maintained in a protected or secure storage location of computing device 200. This protected or secure storage location can be, for example, a location that can be written to only once, that can be written to only by certain components or modules, can be written to only by a device manufacturer, and so forth. Accordingly, once set, the version-based software product activation discussed herein cannot be circumvented by a malicious user by altering the value of the version specific marker 208.

In alternate embodiments, the version specific marker 208 need not be used. For example, all software products in computing device 200 can be activated using the version-based software product activation discussed herein, in which case no check for marker 208 need be made. By way of another example, the version-based software product activation discussed herein can be attempted for all software products, and then other activation techniques used if the version-based software product activation fails to activate a particular software product. By way of yet another example, whether to use the version-based software product activation discussed herein for a particular software product can be identified in software license 204, in software product 202, in module 206, in other components or modules, and so forth.

By using branding identifier 214 and component dependency information 216, it can be seen that software license 204 is effectively bound to a particular version of software product 202. Thus, rather than being bound to a particular computing device and/or a particular user, branding identifier 214 and component dependency information 216 allow software license 204 to be bound to a particular version of software product 202. If the version of software product 202 on computing device 200 is the version to which software license 204 is bound, then software product 202 is activated by software protection service module 206; otherwise, software product 202 license state remains unchanged by software protection service module 206.

FIG. 2 is discussed with reference to a single software product 202. It is to be appreciated, however, that computing device 200 can include multiple software products. Each of these multiple software products has a corresponding software license 204, and software protection service module 206 can determine whether to activate each of these multiple software products based on the corresponding software license as discussed above. A record of the correspondence between a software license and software product can be maintained in a variety of different manners, such as a table or list of product identifiers or locations and software license identifiers or locations, an identifier of a software product being included in the corresponding software license, an identifier of a software license being included in the corresponding software product, and so forth.

Alternatively, no such record of the correspondence between a software license and software product need be maintained. For example, to activate a software product software protection service module 206 can check multiple software licenses until a software license having a branding identifier and component dependency information that are satisfied by the software product is found. If such a software license is found, then module 206 activates the software product; if no such software license is found, then module 206 leaves the software product license state unchanged.

Additionally, each of these multiple software products can have a different corresponding version specific marker 208 to be used to determine whether to use the version-based software product activation discussed herein to activate the software product. The corresponding marker 208 can be identified in different manners (e.g., identified in the software product, identified in the software license, pre-configured in software protection service module 206, identified by another component or module, and so forth).

It should be noted that software protection service module 206 can also perform additional actions as part of the process of activating software product 202. For example, the software license 204 can be authenticated. This authentication can be performed in different manners, such as by verifying a digital signature over the software license (generated based on a public/private key pair of an entity trusted by module 206).

Figure 3:
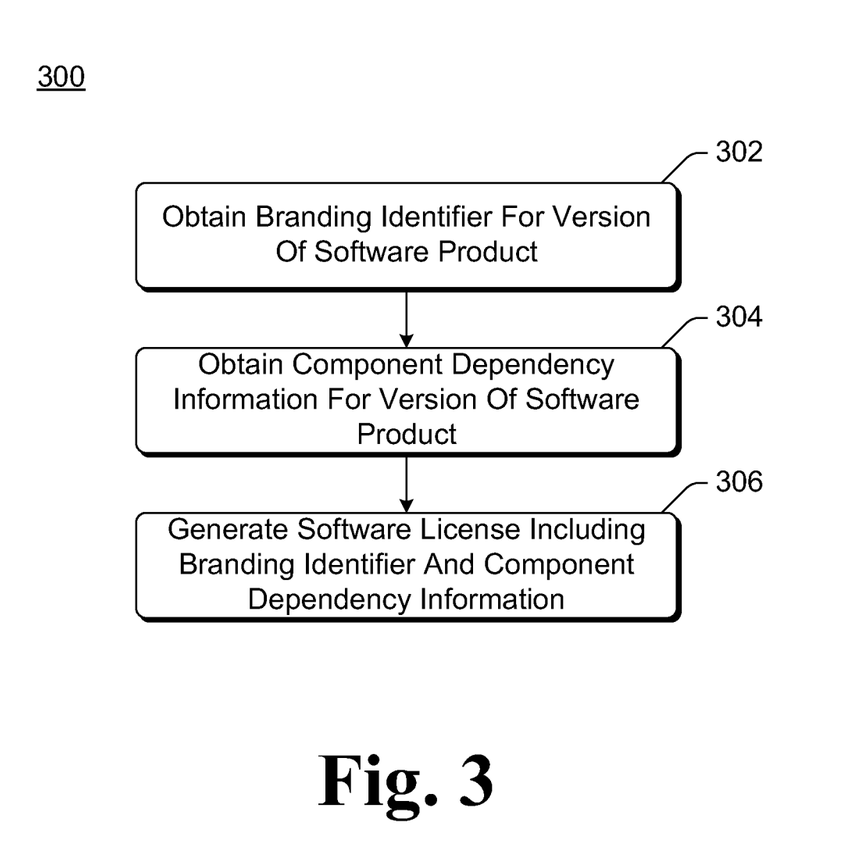
FIG. 3 is a flowchart illustrating an example process for generating a software license in accordance with one or more embodiments.

FIG. 3 is a flowchart illustrating an example process 300 for generating a software license in accordance with one or more embodiments. Process 300 is carried out by a device manufacturer, such as device manufacturer 102 of FIG. 1. Process 300 can alternatively be carried out by a computing device on which a software product is being installed, such as computing device 108 of FIG. 1 or computing device 200 of FIG. 2. Process 300 can be implemented in software, firmware, hardware, or combinations thereof. Process 300 is shown as a set of acts and is not limited to the order shown for performing the operations of the various acts. Process 300 is an example process for generating a software license; additional discussions of generating a software license are included herein with reference to different figures.

In process 300, a branding identifier for a version of a software product is obtained (act 302). The branding identifier can be obtained in different manners, such as being generated by the device manufacturer implementing process 300, being obtained from a manufacturer of the software product, being included in an installation package for the software product, and so forth.

Additionally, component dependency information for the version of the software product is obtained (act 304). Similar to the branding information, the component dependency information can be obtained in different manners, such as being generated by the device manufacturer implementing process 300, being obtained from a manufacturer of the software product, being included in an installation package for the software product, and so forth.

A software license including both the branding identifier obtained in act 302 and the component dependency information obtained in act 304 is generated (act 306). The software license can also include various other information, such as rights granted to the computing device on which the software license is embedded, an expiration date and/or time for the software license, a digital signature of the software license, and so forth.

Once generated, the software license can be subsequently stored on a computing device, such as computing device 108 of FIG. 1 or computing device 200 of FIG. 2. The software license can optionally be stored on multiple different computing devices.

Figure 4:
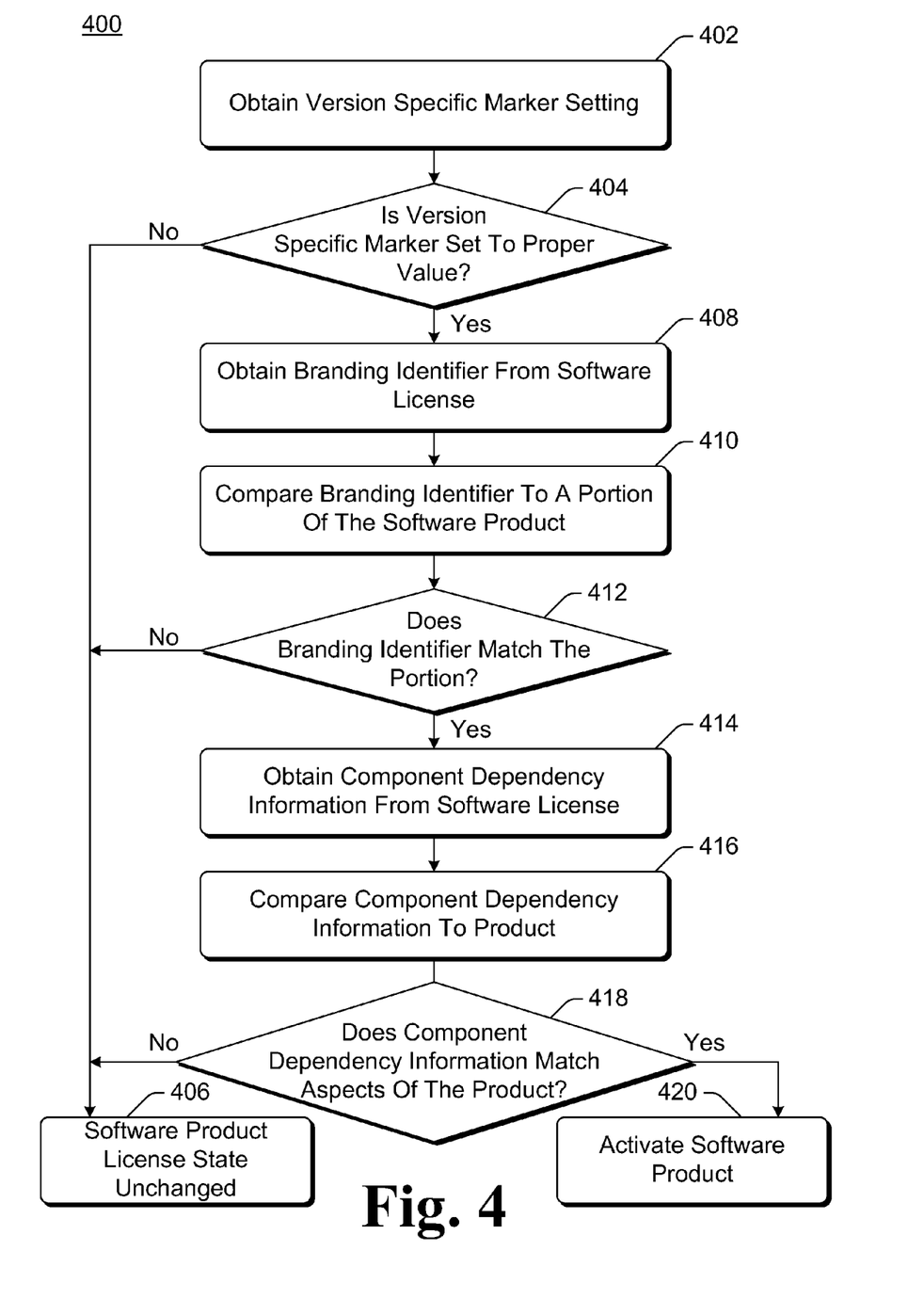
FIG. 4 is a flowchart illustrating an example process for version-based software product activation in accordance with one or more embodiments.

FIG. 4 is a flowchart illustrating an example process 400 for version-based software product activation in accordance with one or more embodiments. Process 400 is carried out by a computing device for a particular software product, such as computing device 108 of FIG. 1 or computing device 200 of FIG. 2, and can be implemented in software, firmware, hardware, or combinations thereof. For example, process 400 can be carried out by software protection service module 206. Process 400 is shown as a set of acts and is not limited to the order shown for performing the operations of the various acts. Process 400 is an example process for version-based software product activation; additional discussions of version-based software product activation are included herein with reference to different figures.

In process 400, a version specific marker setting is obtained (act 402). This version specific marker setting can be obtained, for example, from a protected or secure storage location as discussed above.

A check is made as to whether the version specific marker is set to a proper value (act 404). The marker is set to a value that identifies a product version, and the marker is set to a proper value if the marker is set to a value that identifies the version of the software product to which the software license corresponds, as discussed above. This software license is the software license corresponding to the software product.

The version specific marker not being set to a proper value indicates that the version-based software product activation discussed herein is not to be performed for the software product. Accordingly, if the version specific marker is not set to a proper value then the module implementing process 400 does not activate the software product, keeping the software license state unchanged (act 406).

However, if the version specific marker is set to a proper value then a branding identifier is obtained from the software license corresponding to the software product (act 408). This branding identifier can be, for example, a string of characters as discussed above.

The branding identifier obtained from the software license is compared to at least a portion of the software product (act 410). This comparison is a check of whether the branding identifier obtained from the software license matches the portion of the software product as discussed above.

Process 400 then proceeds based on whether the comparison in act 410 indicates that the branding identifier matches the portion of the software product (act 412). If the branding identifier does not match the portion, then the software license is not a valid software license for the version of the software product for which activation is being attempted. Accordingly, the module implementing process 400 does not activate the software product, keeping the software product license state unchanged (act 406).

However, if the branding identifier does match the portion, then component dependency information is obtained from the software license corresponding to the software product (act 414). This component dependency information can be a variety of different aspects of a particular version of the software product as discussed above.

The component dependency information obtained from the software license is compared to one or more aspects of the software product (act 416). This comparison is a check of whether the one or more aspects obtained from the software license (the component dependency information) match the one or more aspects of the software product as discussed above.

Process 400 then proceeds based on whether the comparison in act 416 indicates that the component dependency information matches one or more aspects of the software product (act 418). If the component dependency information does not match the one or more aspects of the software product, then the software license is not a valid software license for the version of the software product for which activation is being attempted. Accordingly, the module implementing process 400 does not activate the software product, keeping the software product license state unchanged (act 406).

However, if the component dependency information does match the one or more aspects of the software product, then the software license is a valid software license for the version of the software product for which activation is being attempted. Accordingly, the module implementing process 400 indicates that the software license is validated (act 420).

It should be noted that, as discussed above a record of the correspondence between software products and software licenses can be maintained. Such a record can allow the software license corresponding to the software product to be readily identified and used in acts 408-418. Alternatively, multiple software licenses can be checked until a software license having a branding identifier that matches the portion of the software product in act 412 and component dependency information that matches aspects of the product in 418 is found, or until all software licenses are checked.

Thus, as can be seen from the discussions herein, the version-based software product activation allows a software product to be activated on a computing device without accessing any external service or device. A software product on the computing device is activated if the version of the software product is the correct version identified by the software license. No accesses to another service or device need be made, no phone calls to an automated system or other individual (e.g., representing a manufacturer or designer) need be made, and so forth. The software product can be activated in the absence of communication with such other services, systems, or individuals.

Figure 5:
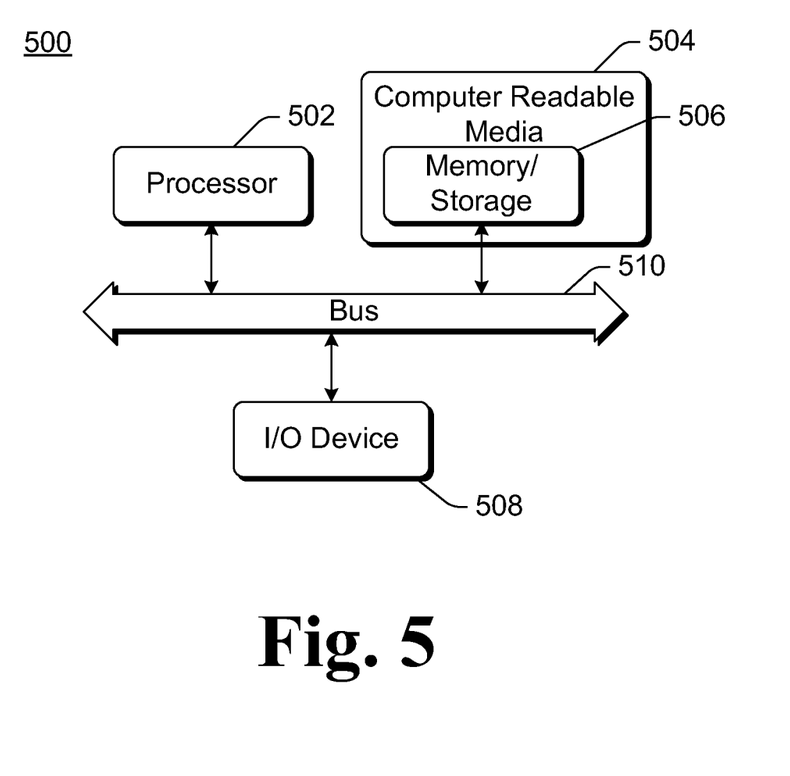
FIG. 5 illustrates an example computing device that can be configured to implement the version-based software product activation in accordance with one or more embodiments.

FIG. 5 illustrates an example computing device 500 that can be configured to implement the version-based software product activation in accordance with one or more embodiments. Computing device 500 can be, for example, computing device 108 of FIG. 1 or computing device 200 of FIG. 2, or can implement at least part of device manufacturer 102 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 5. The features of the version-based software product activation techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
obtaining, by a computing device, a branding identifier that previously was embedded in a software license prior to receipt of the software license by the computing device, the obtaining of the branding identifier comprising obtaining the branding identifier without accessing a source remote from the computing device, the branding identifier identifying a particular version of a software product;
comparing, by the computing device, the branding identifier to a portion of the software product on the computing device to determine whether the branding identifier matches the portion of the software product;
in response to determining that the branding identifier does not match the portion of the software product, maintaining a current license state of the software product; and
in response to determining that the branding identifier matches the portion of the software product:
obtaining, by the computing device, component dependency information from the software license, the component dependency information identifying one or more aspects of the particular version of the software product;
comparing, by the computing device, the component dependency information to one or more aspects of the software product on the computing device to determine whether the component dependency information matches the one or more aspects of the software product; and
in response to determining that the component dependency information matches the one or more aspects of the software product activating the software product, otherwise, maintaining the current license state of the software product.

2. A method as recited in claim 1, the comparing the component dependency information further comprising:
checking a setting of a version specific marker on the computing device, the version specific marker corresponding to the software product; and
obtaining and comparing the branding identifier, and obtaining and comparing the component dependency information when the setting of the version specific marker indicates that version-based software product activation is to be used for the software product.

3. A method as recited in claim 1, further comprising determining a pseudo-random timing of when the comparing the component dependency information to the one or more aspects of the software product is to be performed.

4. A method as recited in claim 1, further comprising waiting a fixed time after comparing the branding identifier to the portion of the software product to compare the component dependency information to the one or more aspects of the software product.

5. A method as recited in claim 1, further comprising repeating the comparing of the component dependency information to the one or more aspects of the software product multiple additional times, and deactivating the software product in response to the comparison of the component dependency information to the one or more aspects of the software product one of the multiple additional times failing.

6. A method as recited in claim 5, wherein a first time interval between a first comparison of the component dependency information to the one or more aspects of the software product and a second comparison of the component dependency information to the one or more aspects of the software product is different than a second time interval between the second comparison of the component dependency information to the one or more aspects of the software product and a third comparison of the component dependency information to the one or more aspects of the software product.

7. A method as recited in claim 5, wherein each of the multiple additional times comprises comparing a different one or more aspects of the particular version of the software product to one or more aspects of the software product on the computing device.

8. A method as recited in claim 5, wherein each of the multiple additional times comprises comparing a same one or more aspects of the particular version of the software product to one or more aspects of the software product on the computing device.

9. A method as recited in claim 1, wherein one of the one or more aspects comprises a setting in a registration store of an operating system of the computing device, and the comparing of the component dependency information to the one or more aspects of the software product comprises determining whether the setting included in the component dependency information is the same as the setting in the registration store of the computing device.

10. A method as recited in claim 1, wherein one of the one or more aspects comprises a presence of a particular module of the software product, and the comparing the component dependency information to the one or more aspects of the software product comprises determining whether the particular module is present in the software product.

11. A method as recited in claim 1, wherein the branding identifier comprises a string of characters that is present in the particular version of the software product, but is not present in any other version of the software product.

12. One or more computer-readable hardware storage media embodying computer-readable instructions that, when executed, implement:
obtaining a branding identifier that was previously embedded in a software license prior to receipt of the software license by the computing device, the obtaining of the branding identifier comprising obtaining the branding identifier without accessing a source remote from the computing device, the branding identifier identifying a particular version of a software product;
comparing the branding identifier to a portion of the software product on the computing device to determine whether the branding identifier matches the portion of the software product;
in response to determining that the branding identifier does not match the portion of the software product, maintaining a current license state of the software product; and
in response to determining that the branding identifier matches the portion of the software product:
obtaining component dependency information from the software license, the component dependency information identifying one or more aspects of the particular version of the software product;
comparing the component dependency information to one or more aspects of the software product on the computing device to determine whether the component dependency information matches the one or more aspects of the software product; and
in response to determining that the component dependency information matches the one or more aspects of the software product then activating the software product, otherwise, maintaining the current license state of the software product.

13. One or more computer-readable hardware storage media as recited in claim 12, the comparing the component dependency information further comprising:
checking a setting of a version specific marker on the computing device, the version specific marker corresponding to the software product; and
obtaining and comparing the branding identifier, and obtaining and comparing the component dependency information when the setting of the version specific marker indicates that version-based software product activation is to be used for the software product.

14. One or more computer-readable hardware storage media as recited in claim 12, the comparing the component dependency information further comprising comparing the component dependency information to the one or more aspects of the software product at a fixed time after comparing the branding identifier to the portion of the software product.

15. One or more computer-readable hardware storage media as recited in claim 12, further comprising repeating the comparing of the component dependency information to the one or more aspects of the software product multiple additional times, and deactivating the software product in response to the comparison of the component dependency information to the one or more aspects of the software product one of the multiple additional times fails.

16. One or more computer-readable hardware storage media as recited in claim 15, wherein a first time interval between a first comparison of the component dependency information to the one or more aspects of the software product and a second comparison of the component dependency information to the one or more aspects of the software product is different than a second time interval between the second comparison of the component dependency information to the one or more aspects of the software product and a third comparison of the component dependency information to the one or more aspects of the software product.

17. One or more computer-readable hardware storage media as recited in claim 15, wherein each of the multiple additional times comprises comparing a different one or more aspects of the particular version of the software product to one or more aspects of the software product on the computing device.

18. One or more computer-readable hardware storage media as recited in claim 15, wherein each of the multiple additional times comprises comparing a same one or more aspects of the particular version of the software product to one or more aspects of the software product on the computing device.

19. One or more computer-readable hardware storage media as recited in claim 12, wherein one of the one or more aspects comprises the presence of a particular module of the software product, and the comparing the component dependency information to the one or more aspects of the software product comprises determining whether the particular module is present in the software product.

20. One or more computer-readable hardware storage media as recited in claim 12, wherein the branding identifier comprises a string of characters that is present in the particular version of the software product but not present in other versions of the software product.

21. A system comprising:
one or more processors;
one or more computer-readable hardware storage media storing instructions which, when executed by the one or more processors, perform operations comprising:
obtaining, by a computing device, a branding identifier that previously was embedded in a software license prior to receipt of the software license by the computing device, the obtaining of the branding identifier comprising obtaining the branding identifier without accessing a source remote from the computing device, the branding identifier identifying a particular version of a software product;
comparing, by the computing device, the branding identifier to a portion of the software product on the computing device to determine whether the branding identifier matches the portion of the software product;
in response to determining that the branding identifier does not match the portion of the software product, maintaining a current license state of the software product; and
in response to determining that the branding identifier matches the portion of the software product:
obtaining, by the computing device, component dependency information from the software license, the component dependency information identifying one or more aspects of the particular version of the software product;
comparing, by the computing device, the component dependency information to one or more aspects of the software product on the computing device to determine whether the component dependency information matches the one or more aspects of the software product; and
in response to determining that the component dependency information matches the one or more aspects of the software product activating the software product, otherwise, maintaining the current license state of the software product.

22. A system as recited in claim 21, the comparing the component dependency information further comprising:
checking a setting of a version specific marker on the computing device, the version specific marker corresponding to the software product; and
obtaining and comparing the branding identifier, and obtaining and comparing the component dependency information when the setting of the version specific marker indicates that version-based software product activation is to be used for the software product.

23. A system as recited in claim 21, further comprising determining a pseudo-random timing of when the comparing the component dependency information to the one or more aspects of the software product is to be performed.

24. A system as recited in claim 21, further comprising waiting a fixed time after comparing the branding identifier to the portion of the software product to compare the component dependency information to the one or more aspects of the software product.

25. A system as recited in claim 21, further comprising repeating the comparing of the component dependency information to the one or more aspects of the software product multiple additional times, and deactivating the software product in response to the comparison of the component dependency information to the one or more aspects of the software product one of the multiple additional times failing.

26. A system as recited in claim 25, wherein a first time interval between a first comparison of the component dependency information to the one or more aspects of the software product and a second comparison of the component dependency information to the one or more aspects of the software product is different than a second time interval between the second comparison of the component dependency information to the one or more aspects of the software product and a third comparison of the component dependency information to the one or more aspects of the software product.

27. A system as recited in claim 25, wherein each of the multiple additional times comprises comparing a different one or more aspects of the particular version of the software product to one or more aspects of the software product on the computing device.

28. A system as recited in claim 25, wherein each of the multiple additional times comprises comparing a same one or more aspects of the particular version of the software product to one or more aspects of the software product on the computing device.

29. A system as recited in claim 21, wherein one of the one or more aspects comprises a setting in a registration store of an operating system of the computing device, and the comparing of the component dependency information to the one or more aspects of the software product comprises determining whether the setting included in the component dependency information is the same as the setting in the registration store of the computing device.

30. A system as recited in claim 21, wherein one of the one or more aspects comprises a presence of a particular module of the software product, and the comparing the component dependency information to the one or more aspects of the software product comprises determining whether the particular module is present in the software product.

31. A system as recited in claim 21, wherein the branding identifier comprises a string of characters that is present in the particular version of the software product, but is not present in any other version of the software product.

* * * * *